United States Patent [19]

Heath et al.

[11] 3,922,284
[45] Nov. 25, 1975

[54] N-SUBSTITUTED AROMATIC THIOETHERPHTHALIMIDES

[75] Inventors: Darrell R. Heath, Pittsfield, Mass.; Frank J. Williams, III, Scotia, N.Y.

[73] Assignee: General Electric Company, Schenectady, N.Y.

[22] Filed: Mar. 30, 1973

[21] Appl. No.: 346,469

[52] U.S. Cl. ........ 260/326 S; 260/45.8 N; 260/281; 260/326 N; 260/326 HL; 260/666.5
[51] Int. Cl.² ............... C07D 209/48; C07D 221/14
[58] Field of Search .................... 260/326 S

[56] References Cited
UNITED STATES PATENTS
3,214,441   10/1965   Dunbar .............................. 260/326

FOREIGN PATENTS OR APPLICATIONS
935,567   11/1955   Germany
6,602,186   8/1966   Netherlands Primary Examiner—Richard J. Gallagher
Assistant Examiner—Diana G. Rivers
Attorney, Agent, or Firm—William A. Teoli; Joseph T. Cohen; Jerome C. Squillaro

[57] ABSTRACT

N-substituted aromatic thioetherimides can be made by effecting reaction between a thiophenoxide and certain derivatives of N-substituted aromatic imides. The aromatic thioetherimides can be employed as antioxidants for hydrocarbon greases and as intermediates for making aromatic thioether anhydrides.

7 Claims, No Drawings

N-SUBSTITUTED AROMATIC TRIOETHERPHTHALIMIDES

The present invention relates to a method involving the reaction of a thiophenoxide and a halo- or nitrosubstituted aromatic imide and to materials made thereby.

The N-substituted aromatic thioetherimides of the present invention are included by the formulas, (I) 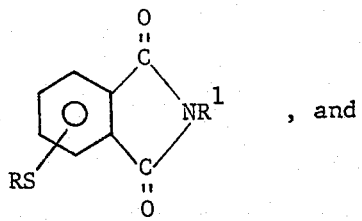, and (II) 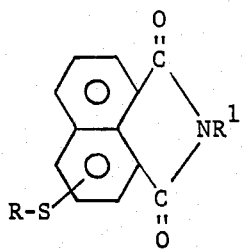

where R is an aromatic radical having from 6–13 carbon atoms, and $R^1$ is an organic radical having from 1–13 carbon atoms.

R of formulas I and II are more particularly phenyl, tolyl, xylyl, naphthyl, hydroxyphenyl, chlorophenyl, etc. $R^1$ of formulas I and II include R radicals, and $C_{(1-8)}$ alkyl radicals, such as methyl, ethyl, propyl, butyl, pentyl, chloroethyl, etc.

The N-substituted aromatic thioetherimides provided by the method of the invention can be made by 1. contacting a thiophenoxide of the formula,

R S⁻                 (III)

and an N-substituted aromatic imide, selected from the class consisting of (IV) 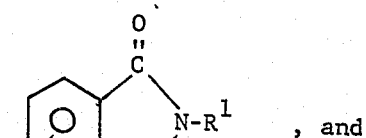, and (V) 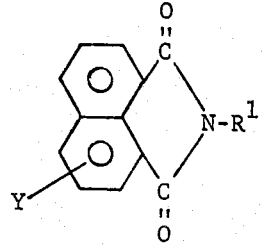

in the presence of an organic solvent, and 2. recovering from the reaction mixture of (1), an N-substituted aromatic thioetherimide, where R and $R^1$ are as previously defined, and Y is selected from the class consisting of nitro, chloro, fluoro, bromo and iodo.

Included by the N-substituted aromatic thioetherphthalimides of formula I are N-phenyl-3-thiophenoxyphthalimide, N-phenyl-4-thiophenoxyphthalimide, N-butyl-3-thio-phenoxyphthalimide, N-phenyl-3-thiophenoxy (4'-hydroxy)- phthalimide, N-phenyl-4-thiocresoxyphthalimide, N-p-chlorophenyl-3-thiophenoxyphthalimide, N-methyl-4-thiophenoxyphthalimide, N-phenyl-3-(4'-chloro)thiophenoxyphthalimide, etc.

Included by the N-substituted aromatic thioethernaphthalimides of formula II are N-phenyl-4-thiophenoxynaphthalimide, N-butyl-4-thiocresoxynaphthalimide, N-phenyl-2-thiophenoxy(4'-hydroxy)naphthalimide, N-methyl-2-thiophenoxynaphthalimide, N-phenyl-4(4'-chloro)thiophenoxynaphthalimide, etc.

Compounds of formulas I and II can be employed as anti-oxidants in hydrocarbon greases, polypropylene, etc.

Included by the N-substituted aromatic imides of formulas IV and V are compounds such as N-phenyl-3-nitrophthalimide, N-phenyl-3-chlorophthalimide, N-phenyl-3-fluorophthalimide, N-phenyl-4-nitrophthalimide, N-butyl-3-nitrophthalimide, N-methyl-4-nitronaphthalimide, N-phenyl-4-chloronaphthalimide, N-phenyl-2-nitronaphthalimide.

The N-substituted aromatic imides of formulas IV and V can be made by reacting in acetic acid the corresponding Y-substituted phthalic or naphthalic anhydrides, respectively, with an aromatic or aliphatic amine such as aniline, toluidine, methylamine, butyl amine, etc.

Included by the thiophenoxides of formula II are preformed, or in situ generated reagents of thiophenols such as thiophenol, p-methylthiophenol, p-hydroxythiophenol, p-chlorothiophenol, p-aminothiophenol, etc. The preformed thiophenoxides of formula III can be made by using a stoichiometric amount of the above thiophenol and an alkali metal hydroxide, such as sodium hydroxide, potassium hydroxide, lithium hydroxide, etc., in accordance with the following procedure: a mixture of 1.1 parts of thiophenol and 0.4 parts of a 50% aqueous solution of sodium hydroxide is refluxed under nitrogen with a mixture of dimethylsulfoxide and benzene. Water is azeotropically removed from the reaction mixture and benzene is distilled off to give a mixture of the anhydrous salt in dimethylsulfoxide.

In addition to preformed thiophenoxides bases can be employed to generate thiophenoxides in situ such as organic amines, for example, triethylamine, trimethylamine, tributylamine, pyridine, dicyclohexylmethylamine, 1,5-dicyabicyclo[4.3.0]non-5-ene, etc.; alkali metal carbonates such as potassium carbonate, sodium carbonate, calcium carbonate, etc. These bases can be used to generate the thiophenoxide in reaction mixtures of the above thiophenol and N-substituted aromatic imide of formulas IV and V. There can be employed from about 1 to 5 stoichiometric equivalents of base, per equivalent of imide.

In the practice of the invention, thioaryl compound of formula III, or "thiophenoxide" is contacted with the N-substituted aromatic imide of formula IV or "aromatic imide" in the presence of an organic solvent and a base catalyst.

Substantially equal molar amounts of thiophenoxide and N-substituted aromatic imide can be employed to provide optimum yields. Reaction is preferably performed under an inert gas atmosphere, such as nitrogen, and under substantially anhydrous conditions.

Agitation of the mixture will facilitate reaction which can be performed at temperatures of 25°C to 150°C. Reaction times can vary between 5 minutes or less to 48 hours or more.

Reaction can be facilitated by the employment of an organic solvent such as dimethylformamide, dimethylsulfoxide, dimethylacetamide, hexamethylphosphoric triamide, etc. or mixtures of these dipolar aprotic solvents with nonpolar solvents such as toluene, chlorobenzene, etc.

In order that those skilled in the art will be better able to practice the invention the following examples are given by way of illustration and not by way of limitation. All parts are by weight.

EXAMPLE 1

An equal molar mixture of N-phenyl-3-nitrophthalimide and sodium thiophenoxide was stirred in a nitrogen atmosphere over night in the presence of dimethyl sulfoxide. The sodium thiophenoxide was prepared by refluxing in a nitrogen atmosphere for 8 hours a mixture of 1.1 parts of thiophenol, and 0.4 parts of a 50% aqueous solution of sodium hydroxide in a mixture of dimethyl sulfoxide and benzene.

The above reaction mixture of N-phenyl-3-nitrophthalimide and sodium thiophenoxide was then added to excess water to produce a yellow granular precipitate which was insolated by filtration and washed with water. The crude product was then dissolved in boiling absolute ethanol. There was obtained upon cooling, a 91% yield of N-phenyl-3-thiophenoxy-phthalimide having a melting point of 146°–148°C. The identity of the product was confirmed by infrared and nmr spectra and by elemental analysis calculated for $C_{20}H_{13}NO_2S$: Theor: C, 72.5; H, 3.92; N, 4.23; S, 9.66. Found: C, 72.2; H, 4.2; N, 4.2; S, 8.5.

EXAMPLE 2

There was added N-phenyl-3-nitrophthalimide and dry dimethyl sulfoxide to a mixture of thiophenol and potassium carbonate at room temperature in a nitrogen atmosphere with stirring. The resulting mixture contained an equal molar amount of thiophenol, potassium carbonate and N-phenyl-3-nitrophthalimide while the solids content of the mixture was about 15%. After the mixture had been stirred for 5 minutes at room temperature vpc analysis showed that over 90% of the reactants had been consumed. The reaction was completed after about 30 minutes. The mixture was then added to an excess of a 1% acetic acid solution to effect the precipitation of a yellow solid. There was obtained about a 99% yield of crude product. Based on method of preparation and IR-spectra, the product was N-phenyl-3-thiophenoxyphthalimide.

EXAMPLE 3

A mixture of 1.2 parts of triethylamine, 1.3 parts of thiophenol, about 50 parts of dimethylformamide was stirred at room temperature under a nitrogen atmosphere. There was added to the aforementioned mixture, 2.68 parts of N-phenyl-3-nitrophthalimide and the resulting solution immediately became bright red in color. After 5 minutes of stirring the vpc showed no trace of the starting imide. The reaction mixture was then poured into excess acidic ice water to produce a 98% yield of N-phenyl-3-thiophenoxyphthalimide. The identity of the product was confirmed by its IR-spectra when compared to the product of Example 1.

EXAMPLE 4

A mixture of 2.48 parts of N-butyl-3-nitrophthalimide, 1.10 parts of thiophenol and about 25 parts of dimethylformamide was stirred at room temperature under a nitrogen atmosphere. There was then added about 1.01 part of triethylamine and the mixture was stirred at room temperature for 5 minutes. There was obtained a 92% yield of N-butyl-3-thiophenoxyphthalimide following the work-up procedure previously described. The identity of the product was confirmed by its infrared and nmr spectra.

EXAMPLE 5

A mixture of 1.26 parts of p-hydroxythiophenol, 2.68 parts of N-phenyl-3-nitrophthalimide and 25 parts of dimethylformamide was stirred under a nitrogen atmosphere at room temperature. After the addition of 0.51 part of triethylamine, the mixture was stirred at room temperature for 15 minutes. The mixture was then poured into excess acidic water and there was obtained 96% yield of product. Based on method of preparation and its infrared and nmr spectra, the product was N-phenyl-3-thiophenoxy (4'-hydroxy)-phthalimide

EXAMPLE 6

A mixture of 2.4 parts of N-phenyl-4-nitronaphthalimide, 1 part thiophenol and 24 parts of anhydrous dimethylformamide were stirred at 60°C under a nitrogen atmosphere. There was added 0.9 part of triethylamine and the resulting reaction mixture was stirred for 3 hours at 60°C. The reaction mixture was cooled to room temperature and added to 250 parts of 1.2NHCl solution. The resulting precipitate was collected and dried to give 3.4 parts (99% yield) of N-phenyl-4-thiophenoxynaphthalimide, m.p. 278°–281°C. This material was identified from its infrared and proton nmr spectra and from the fact that it was identical to the product obtained from the reaction of aniline with 4-thiophenoxy-1,8-naphthalic anhydride.

EXAMPLE 7

A mixture of 10 parts N-phenyl-3-nitrophthalimide, 4.6 parts p-toluenethiol and 100 parts anhydrous dimethylformamide were stirred under a nitrogen atmosphere at room temperature. To this stirred mixture was added 4.2 parts triethylamine and the solution was stirred for 2 hours at room temperature. The reaction mixture was poured into 1000 parts of 1.2 N HCl and the resulting precipitate collected and dried to give 13 parts (100% yield) of N-phenyl-3-thiocresoxyphthalimide, m.p. 203°–205°C. Recrystallization from ethyl acetate gave a sample m.p. 204°–205°C. The sample was identified from its infrared and $^{13}C$ nmr spectra and from its method of preparation.

EXAMPLEL 8

A mixture of 1 part of sodium thiocresoxide, 1.58 parts of N-phenyl-3-fluorophthalimide and 15 parts of anhydrous dimethylformamide were stirred under a nitrogen atmosphere at room temperature for 2 hours.

The mixture was added to 150 parts of 1.2N HCl and the resulting precipitate was collected and dried to give 2.2 parts (99% yield) of N-phenyl-3-thiocresoxyphthalimide, m.p. 198°–200°C. The product was identical in all respects to the material obtained in Example 7.

EXAMPLE 9

A mixture of 1.5 parts of sodium thiocresoxide, 2.6 parts of N-phenyl-4-nitrophthalimide and 25 parts of anhydrous dimethylformamide were stirred under a nitrogen atmosphere at 60°C for 2 hours. The mixture was cooled to room temperature and added to 300 parts of 1.2N HCl. The resulting precipitate was collected and dried to give 3.3 parts of N-phenyl-4-thiocresoxyphthalimide (96% yield) m.p.155°–158°C. Recrystallization from absolute ethanol gave a sample m.p. 165°–**°C. The product was identified from its infrared and $^{13}$C nmr spectra and from its method of preparation.

Although the above examples are limited to only a few of the very many N-substituted aromatic thioetherimides which can be made by the practice of the present invention, it should be understood that these anti-oxidants for hydrocarbon greases can be made by contacting thiophenoxide of formula III and N-substituted aromatic imide of formula IV.

What we claim as new and desire to secure by Letters Patent of the United States is:

1. A compound of the formula

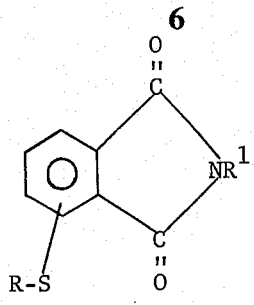, and where R is a group selected from the class consisting of phenyl, tolyl, xylyl, naphthyl, hydroxyphenyl, chlorophenyl and aminophenyl and $R^1$ is a group selected from the class consisting of R radicals and $C_{(1-8)}$ alkyl radicals.

2. An N-substituted aromatic thioetherimide in accordance with claim 1 where R and $R^1$ are phenyl.

3. The compound N-phenyl-3-phenylthiophthalimide

4. The compound N-butyl-3-phenylthiophthalimide

5. The compound N-phenyl-3-(4'-hydroxy)phenylthiophthalimide.

6. The compound N-phenyl-3-methylphenylthiophthalimide.

7. The compound N-phenyl-4-methylphenylthiophthalimide.

* * * * *